United States Patent [19]

Motohashi et al.

[11] Patent Number: 5,125,206
[45] Date of Patent: Jun. 30, 1992

[54] TRUSS STRUCTURE

[75] Inventors: Shoichi Motohashi, Yokohama; Fumihiro Kuwao, Tama, both of Japan

[73] Assignee: Kabushiki Kaisha Toshiba, Kawasaki, Japan

[21] Appl. No.: 453,070

[22] Filed: Dec. 18, 1989

Related U.S. Application Data

[63] Continuation-in-part of Ser. No. 236,847, Aug. 26, 1988.

[30] Foreign Application Priority Data

Aug. 27, 1987 [JP] Japan .................. 62-213544

[51] Int. Cl.⁵ ........................................ E04H 12/18
[52] U.S. Cl. ................................. 52/646; 52/648
[58] Field of Search .............. 52/646, 645, 648, 111

[56] References Cited

U.S. PATENT DOCUMENTS

| | | | |
|---|---|---|---|
| 4,667,451 | 5/1987 | Onoda | 52/646 |
| 4,745,725 | 5/1988 | Onoda | 52/646 |
| 4,765,114 | 8/1988 | Wesselski | 52/646 |
| 4,771,585 | 9/1988 | Onoda et al. | 52/646 |
| 4,819,399 | 4/1989 | Onoda | 52/645 |

FOREIGN PATENT DOCUMENTS 61-98699  5/1986  Japan .

OTHER PUBLICATIONS

H. G. Bush et al., "Synchronously Deployable Tetrahedral Truss Reflector", Large Space Antenna Systems Technology-1984, Dec. 4-6, 1984, pp. 237-250.

J. V. Coyner, "Box Truss Development and its Applications", Large Space Antenna Systems Technology—1984, Dec. 4-6, 1984, pp. 214-233.

Primary Examiner—Michael Safavi
Attorney, Agent, or Firm—Oblon, Spivak, McClelland, Maier & Neustadt

[57] ABSTRACT

A truss structure includes a first truss element having, a foldable frame obtained by assembling a plurality of beam members into a cube, foldable diagonal beam members located on diagonals of two opposing planes of the frame, respectively, and telescopic diagonal beam members located on diagonals of four planes other than the two planes of the frame, respectively, a second truss element having, a foldable frame obtained by assembling a plurality of beam members into a cube, foldable diagonal beam members located on diagonals of two opposing planes of the frame, respectively, and telescopic diagonal beam members located on diagonals of three planes other than the two planes of the frame, respectively, a third truss element having, a foldable frame obtained by assembling a plurality of beam members into a cube, and a telescopic diagonal beam member located on a diagonal connecting farthest node portions of the frame, and an adjusting unit for adjusting the length of each telescopic diagonal beam member.

5 Claims, 11 Drawing Sheets

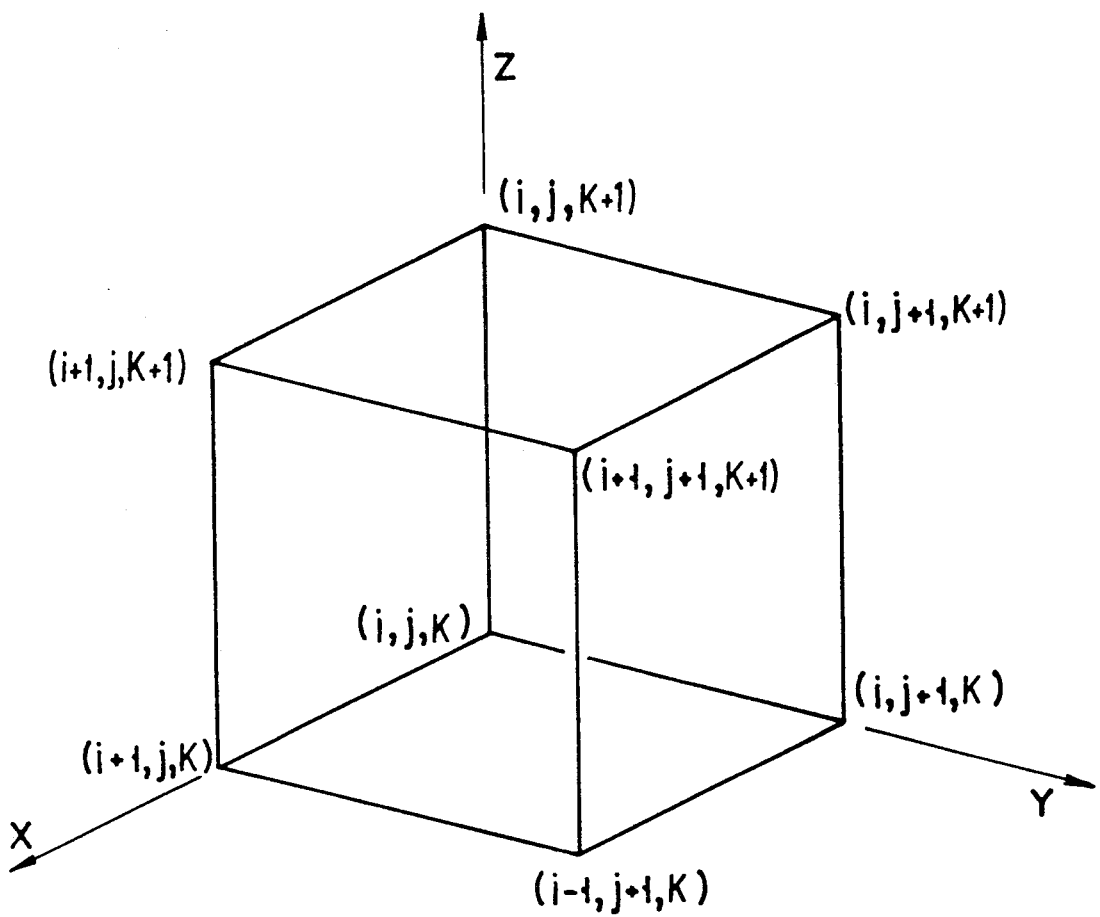
F I G. 2

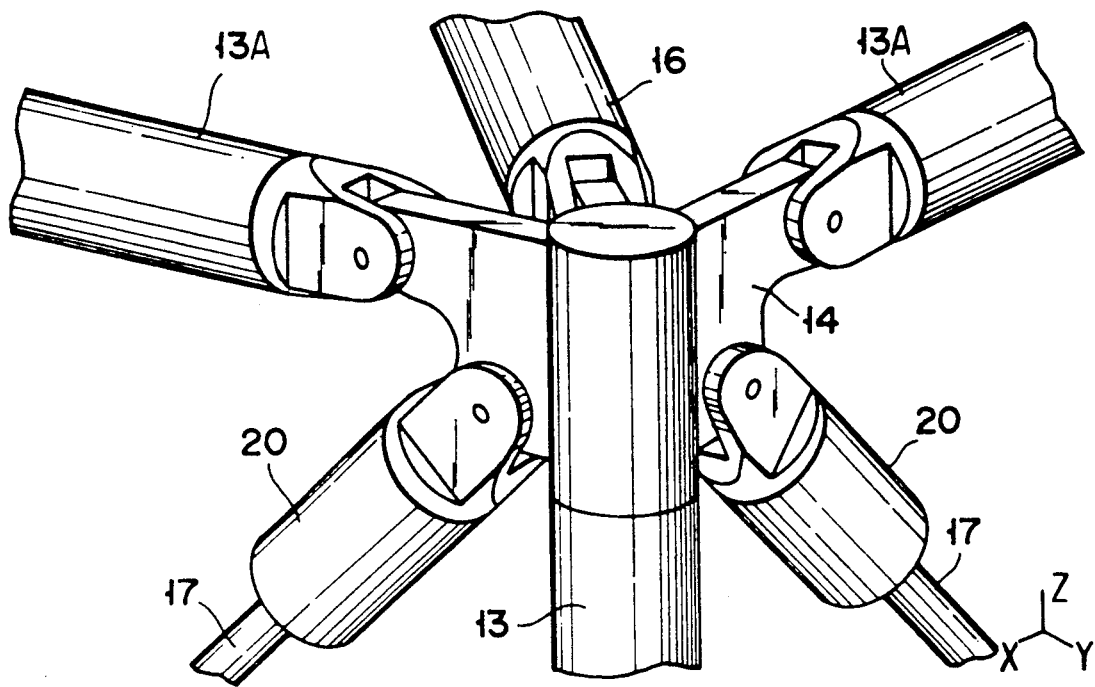
F I G. 4A
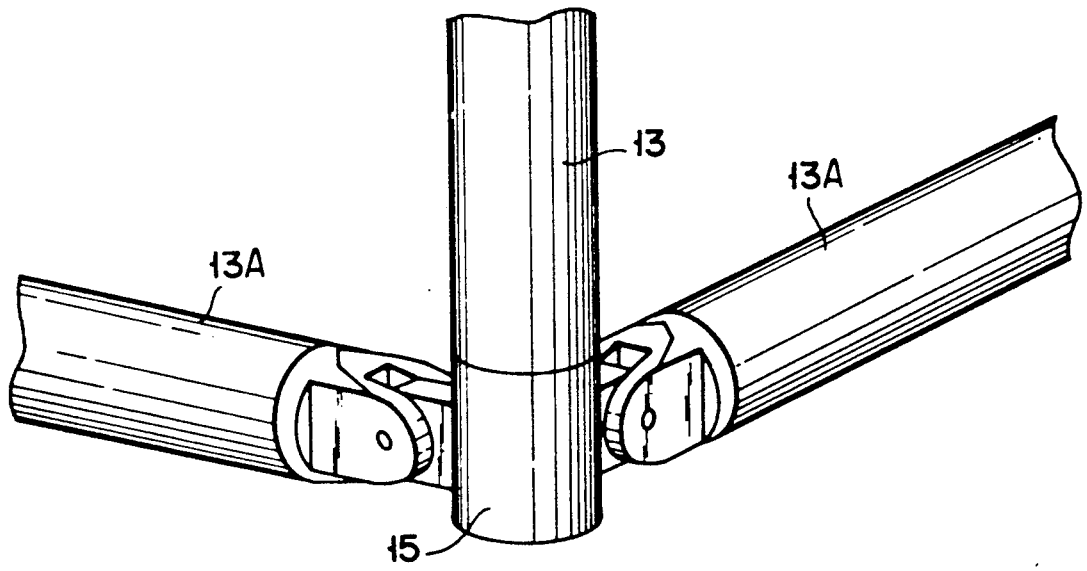
F I G. 4B

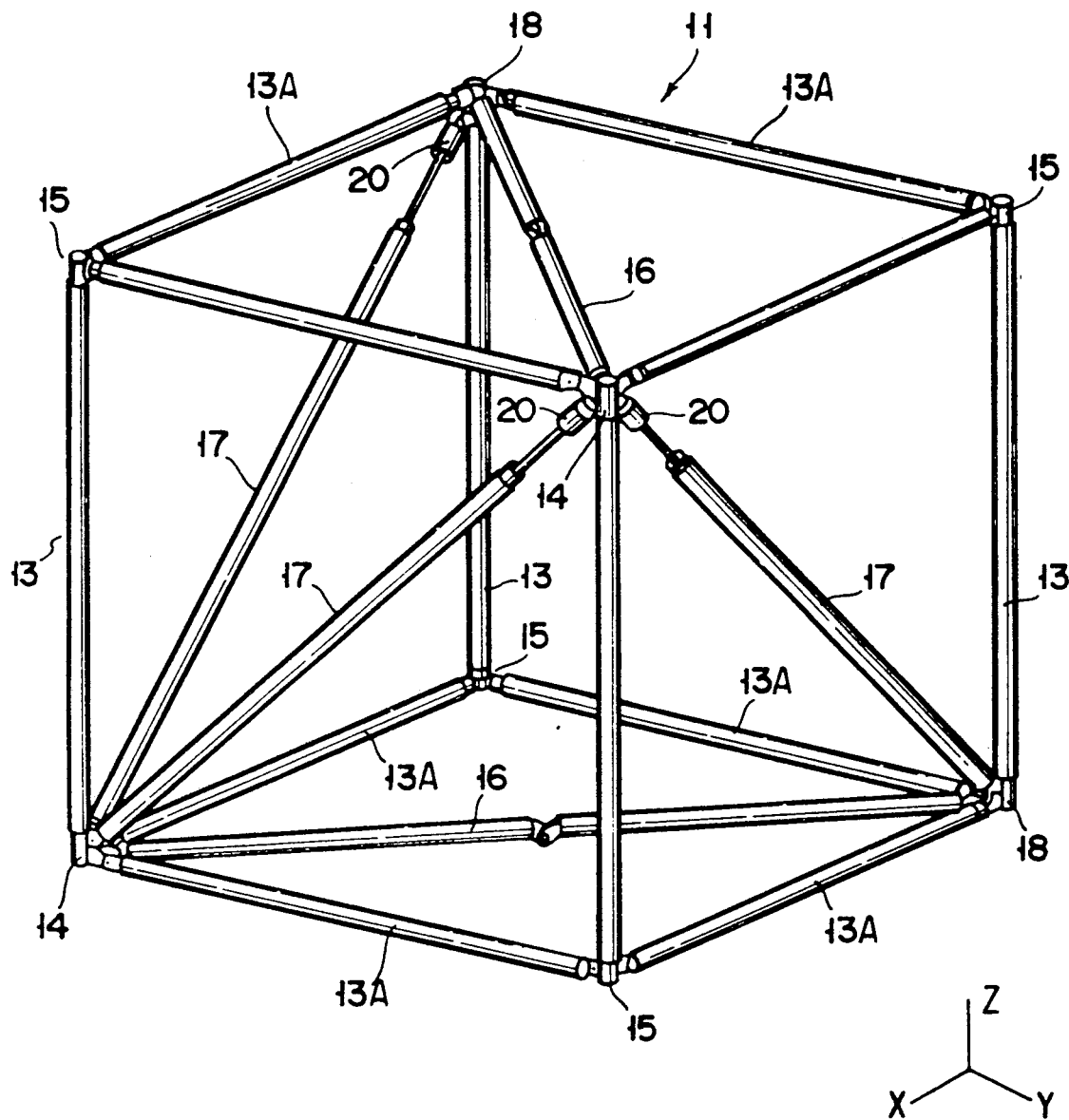
F I G. 5

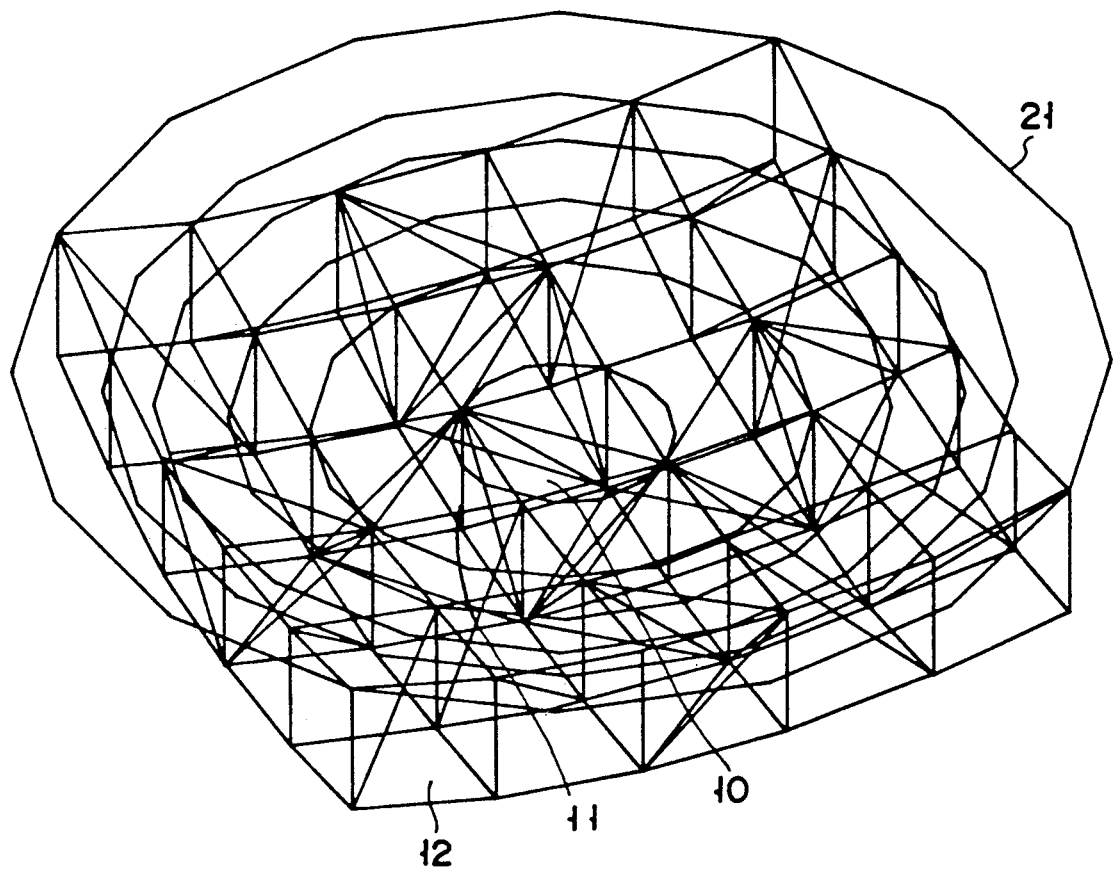
F I G. 8

TRUSS STRUCTURE

This application is a continuation-in-part of application Ser. No. 07/236,847, filed on Aug. 26, 1988, now abandoned.

BACKGROUND OF THE INVENTION

1. Field of the Invention

The present invention relates to a foldable/deployable truss structure suitable for an antenna support structure or a platform support structure mounted in, e.g., a spacecraft.

2. Description of the Related Art

In a method proposed to construct a truss structure in the space, a folded structure is transported from the ground by a launch vehicle and deployed in the space. A conventional truss structure of this type is a two-dimensional structure called a deployable truss disclosed in Japanese Patent Disclosure (Kokai) No. 61-98699.

However, the shape and size of the above truss structure are limited in a deployed state due to its structural property. Therefore, if the assembly precision of the truss structure is degraded by a thermal deformation or various vibrations in the space, for example, the degraded precision cannot be corrected.

For this reason, it is proposed to mount a deformation correction mechanism for correcting the thermal deformation of the truss structure and maintaining desired assembly precision on the conventional truss structure.

However, if the deformation correction mechanism is added to the truss structure, the number of parts constituting the structure is increased, the structure is complicated, and the weight of the structure is increased.

In addition, in order to prevent vibrations produced in the truss structure, e.g., a resonance between a control system of the truss structure and the structure, it is proposed, like a conventional support structure of a solar array paddle, to increase the stiffness of the entire truss structure, adhere a damping material, or mount a vibration suppression mechanism.

However, among these methods, when the stiffness of the structure is increased, a sufficient damping effect cannot be obtained because the material of the structure is limited, and the weight is increased. When the damping material is adhered on the structure, a sufficient damping effect cannot be obtained if the structure is large. Furthermore, when the vibration suppressing mechanism is mounted on the structure, the number of parts of the structure is increased to increase the weight of the structure.

As described above, in order to put the conventional truss structure into practical use, a deformation correction mechanism or a protecting means against vibrations must be mounted on the structure. As a result, the structure of the entire truss structure is complicated so as to increase the weight of the structure.

SUMMARY OF THE INVENTION

It is, therefore, an object of the present invention to provide a truss structure which is comparatively simple wherein a geometric shape and a dynamic property of the structure can be easily adjusted.

The above object of the present invention can be achieved by a truss structure having a plurality of truss elements as presented below. That is, this truss structure comprises:

(a) a foldable first truss element having,
  a frame obtained by assembling a plurality of beam members into a cube, both ends of each of the beam members being pivotally hinged to node portions of the cube,
  foldable diagonal beam members located on diagonals of two opposing planes of the frame, respectively, both ends of each of the foldable diagonal beam members being pivotally hinged to node portions, and
  telescopic diagonal beam members located on diagonals of four planes other than the two planes of the frame, respectively, both ends of each of the telescopic diagonal beam members being pivotally hinged to node portions;

(b) a foldable second truss element having,
  a frame obtained by assembling a plurality of beam members into a cube, both ends of each of the beam members being pivotally hinged to node portions of the cube,
  foldable diagonal beam members located on diagonals of two opposing planes of the frame, respectively, both ends of each of the foldable diagonal beam members being pivotally hinged to node portions, and
  telescopic diagonal beam members located on diagonals of three planes other than the two planes of the frame, respectively, both ends of each of the telescopic diagonal beam members being pivotally hinged to node portions;

(c) a foldable third truss element having,
  a frame obtained by assembling a plurality of beam members into a cube, both ends of each of the beam members being pivotally hinged to node portions of the cube, and
  a telescopic diagonal beam member located on a diagonal connecting the farthest node portions of the frame, both ends of the extendable diagonal beam member being pivotally hinged to the node portions; and (d) an adjusting mechanism for adjusting a length of each telescopic diagonal beam member mounted in the first, second, and third truss elements.

As described above, in the truss structure according to the present invention, since the length of the telescopic diagonal beam member is adjusted by the length adjusting mechanism, the first, second, and third truss elements can be extended or folded. In addition, by further adjusting the length of the telescopic diagonal beam member, the truss structure in an deployed state can be deformed into a desired geometric shape, and its vibration or dynamic property can be changed. As a result, according to the present invention, there is provided a truss structure simpler in structure and lighter in weight than a conventional truss structure.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 is a schematic view showing coordinates of nodes of a truss element;

FIGS. 4A and 4B are perspective views showing a joint member and a hinge portion at a node of the truss elements;

FIG. 5 is a perspective view showing a second truss element;

FIG. 8 is a schematic perspective view in which the truss structure according to the present invention is deformed into a parabolic antenna support structure.

DESCRIPTION OF THE PREFERRED EMBODIMENT

An embodiment of the present invention will be described below with reference to the accompanying drawings.

Figure 1:
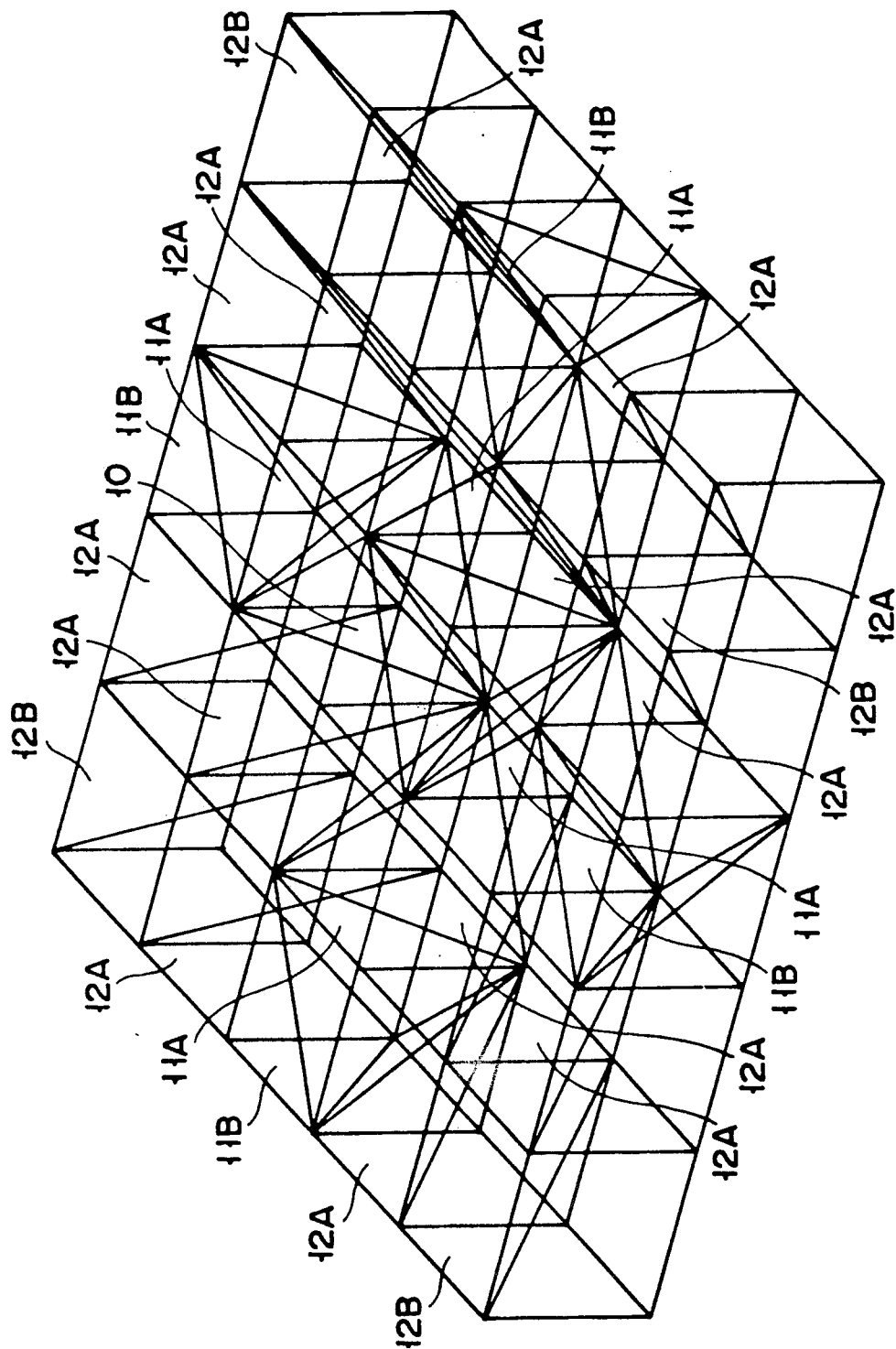
FIG. 1 is a schematic perspective view showing an embodiment of a structure according to the present invention.

FIG. 1 shows a truss structure according to an embodiment of the present invention. This truss structure comprises first truss element 10, a plurality of second truss elements 11A,B, and a plurality of third truss elements 12A,B. In this embodiment, first truss element 10 is located at the center of the structure, second truss element 11A is hinged to each of four side planes of truss element 10, and another second truss element 11B is hinged to an outer side plane of each truss element 11A. That is, truss elements 10, 11A, and 11B are arranged in a cross shape. Third truss elements 12A are hinged to both sides of each of truss elements 11A and 11B, and another third truss element 12B is hinged to each of remaining four corners of the structure. Truss elements 10, 11A, 11B, 12A, and 12B commonly use side planes therebetween and are arranged in a substantially square shape. This truss structure can be used as a platform located in, e.g., the space.

Each truss element will be described below. Each of truss elements 10, 11A, 11B, 12A, and 12B can be represented by nodes on an orthogonal coordinate system, as shown in FIG. 2. That is, assuming that an arbitrary node coordinate point is $(i,j,k)$ and length A of one side of a cube is a constant, a node on a diagonal farthest from coordinate point $(i,j,k)$ is obtained as $(Ai,Aj,Ak)$.

Figure 3:
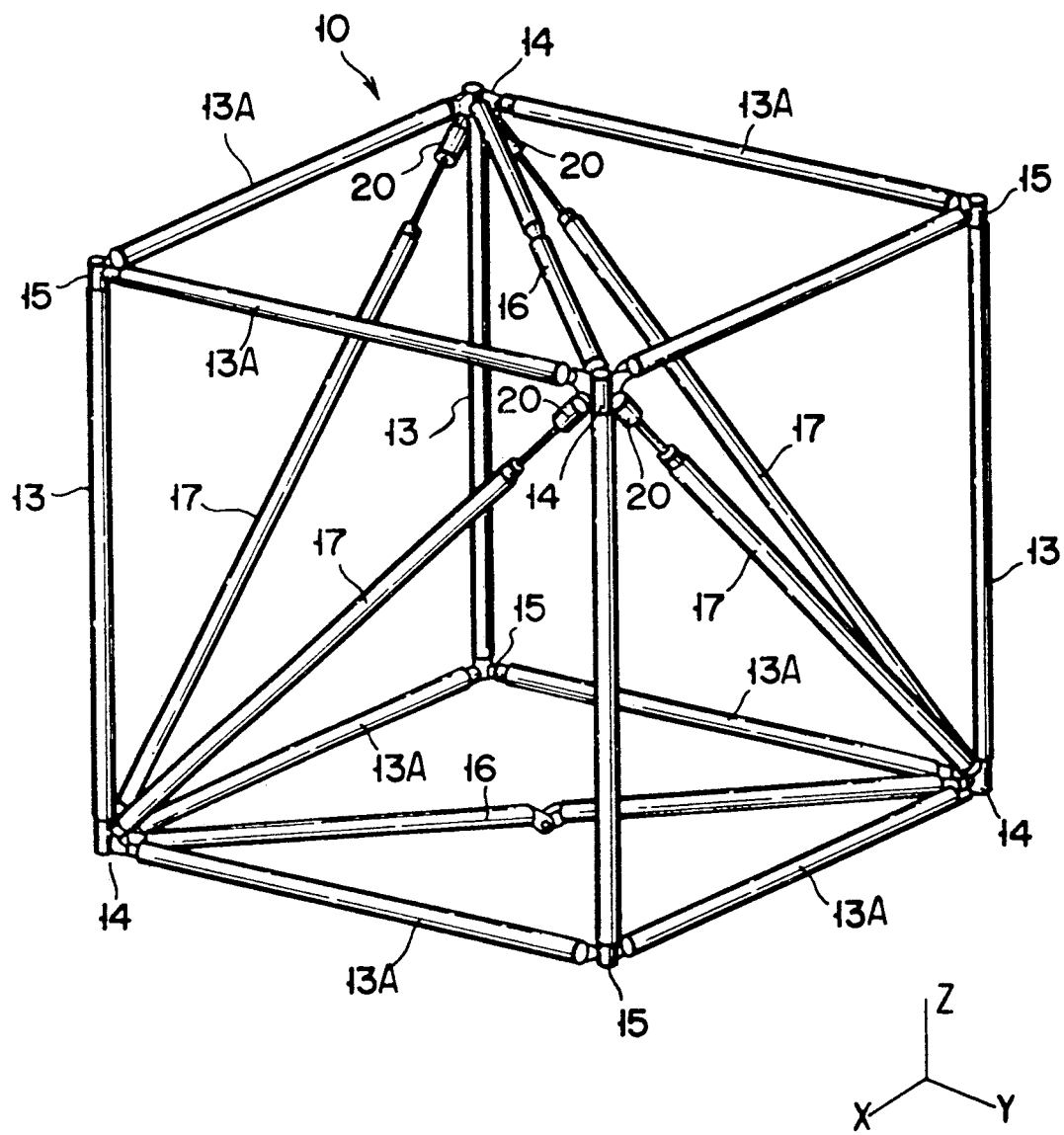
FIG. 3 is a perspective view showing a first truss element.

As shown in FIG. 3, first truss element 10 has four vertical beam members 13 and eight lateral beam members 13A. The eight lateral beam members 13A are pivotally hinged at the ends of the vertical beam members 13 by joint members 14 shown in FIG. 4A or joint members, 15 shown in FIG. 4B, thereby forming a cubic frame. Nodes of the cubic frame can be represented by eight coordinate points $(i,j,k)$, $(i,j,k+1)$, $(i+1,j,k)$, $(i,j+1,k)$, $(i,j+1,k+1)$, $(i+1,j+1,k)$, $(i+1,j,k+1)$ and $(i+1,j+1,k+1)$. Foldable diagonal beam members 16 are located between nodes $(i,j,k+1)$ and $(i+1,j+1,k+1)$ and nodes $(i+1,j,k)$ and $(i,j+1,k)$ on diagonals of two opposing planes as upper and lower planes of truss element 10 shown in FIG. 3, respectively. Both ends of each beam member 16 are pivotally hinged to vertical beam member 13 by joint members 14. Telescopic diagonal beam members 17 are located between nodes $(i,j,k+1)$ and $(i,j+1,k)$, $(i+1,j,k)$ and $(i+1,j+1,k+1)$, $(i+1,j+1,k+1)$ and $(i,j+1,k)$, and $(i+1,k)$ and $(i,j,k+1)$ on diagonals of four side planes of first truss element 10, respectively. Both ends of each beam member 17 are pivotally hinged to vertical beam members 13 by joint members 14.

As shown in FIG. 5, second truss element 11 has four vertical beam members 13 and eight lateral beam members 13A. The eight lateral beam members 13A are pivotally hinged at the ends of the vertical beam members 13 by joint members 14, 15, and 18, thereby forming a cubic frame. Foldable diagonal beam members 16 are located between nodes $(i,j,k+1)$ and $(i+1,j+1,k+1)$ and nodes $(i+1,j,k)$ and $(i,j+1,k)$ on diagonals of two opposing planes as upper and lower planes of truss element 11. Both ends of each beam member 16 are pivotally hinged to vertical beam members 13 by joint members 14 and 18. Telescopic diagonal beam members 17 are located between nodes $(i,j,k+1)$ and $(i+1,j,k)$, $(i+1,j,k)$ and $(i+1,j+1,k+1)$, and $(i+1,j+1,k+1)$ and $(i,j+1,k)$ on diagonals of three side planes of truss element 11. Both ends of each beam member 17 are pivotally hinged to vertical beam members 13 by joint members 14 and 18.

Figure 6:
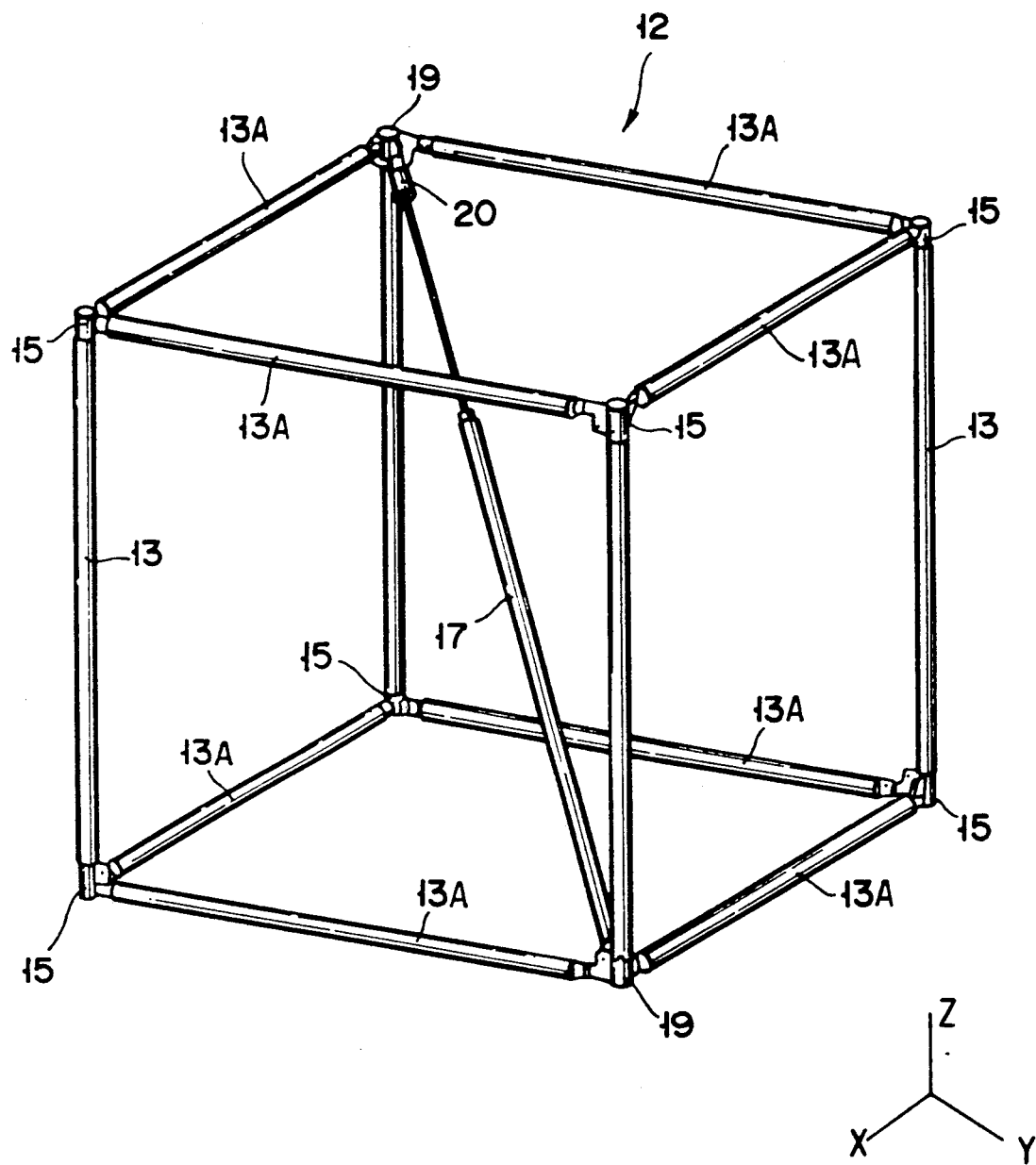
FIG. 6 is a perspective view showing a third truss element.

As shown in FIG. 6, third truss element 11 has four vertical beam members 13 and eight lateral beam members 13A. The eight lateral beam members 13A are pivotally hinged at the ends of the vertical beam members 13 by joint members 15 and 19, thereby forming a cubic frame. Telescopic diagonal beam member 17 is located between nodes $(i,j,k+1)$ and $(i+1,j+1,k)$ on one diagonal of the cube. Both ends of beam member 17 are pivotally hinged to vertical beam members 13 by joint members 19.

Each beam member 17 mounted in truss elements 10, 11, and 12 has extension driving actuator 20 including a motor, reduction gears, ball screws, and nuts. Actuator 20 is connected to a controller and driven by a command signal output therefrom. Preferably, a position sensor is mounted on beam member 17 and actuator 20 is feedback-controlled on the basis of a signal from the sensor. In this case, the actuator can be controlled more precisely.

Figure 11:
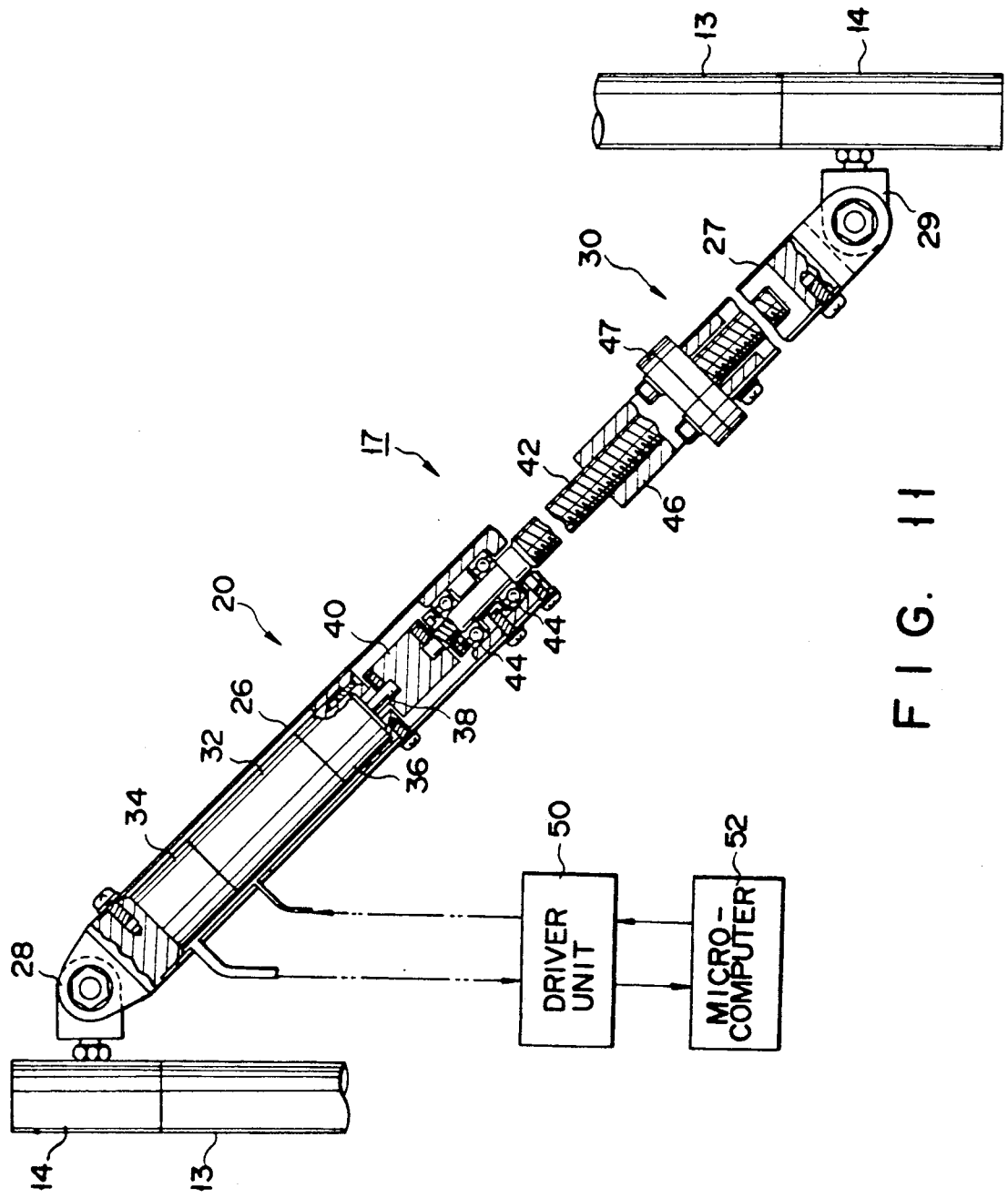
FIG. 11 shows a detailed view of the actuator of a diagonal beam.
Figure 12:
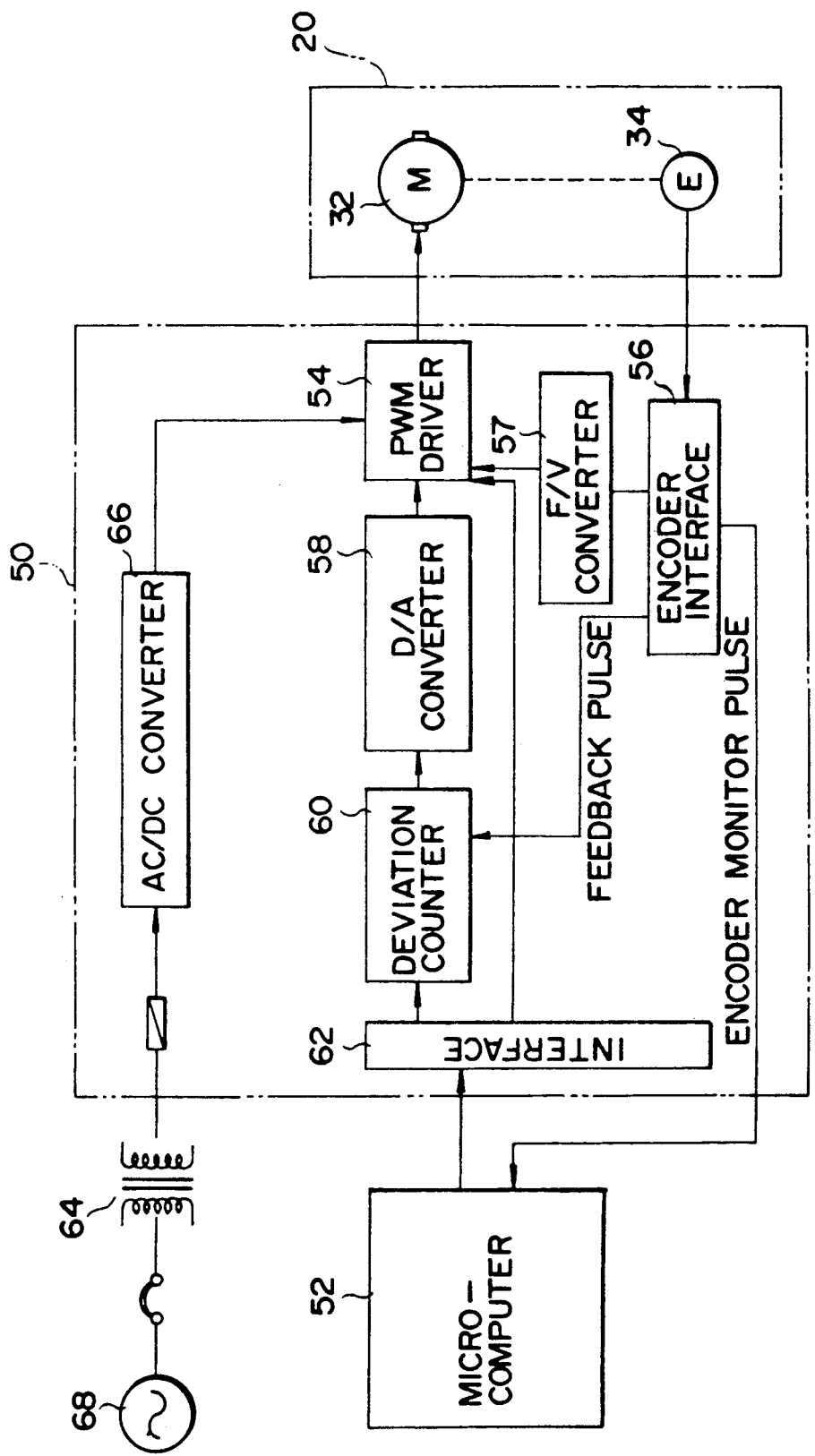
FIG. 12 shows a schematic of a drive controlling device which extends and contracts the diagonal beam member.

The following is an explanation, referring to FIG. 11 and FIG. 12, of the diagonal beam members and the drive-controlling device which extends/contacts the diagonal beam members.

As shown in FIG. 11, diagonal beam member 17 has actuator 20 and beam member 30 arranged in series with actuator 20. Actuator 20 has short pipe member 26, which is connected to vertical beam member 13 by hinge joint 28 of joint member 14. Motor 32 is provided at the proximal end portion of pipe member 26, and rotary encoder 34 as a detection sensor is mounted on the axis which projects from this motor 32 rearward. Reduction gear 36 (Trade name: Harmonic Drive) is connected to the axis which projects forward from motor 32, and the proximal end of ball screw 42 is connected via coupling 40 to an output axis 38 which projects from reduction gear 36. The section attached to the proximal end of this ball screw 42 is supported by two ball bearings 44.

It is preferable that the above motor, rotary encoder, and reduction gear may be integrally formed. Hi-T Drive DC Servo Actuator RH-5-5501-E100Z manufactured by Harmonic Drive Systems, Inc. is an good example thereof.

Beam member 30 also has long pipe member 27, which is connected to the second vertical beam member 13 by hinge joint 29 of joint member 14. The free end of ball screw 42 which extends forward is inserted into pipe member 27. Nut 46 is fixed to the free end of pipe member 27 by flange joint 47, and ball screw 42 is engaged with nut 46. Therefore, when ball screw 42 is rotated, nut 46 moves along ball screw 42. Consequently, the length of diagonal beam member 17 can be varied.

A good example of the ball screw and nut, is RNFT 1006-2.5 manufactured by NIPPON SEIKO CO.

As shown in FIG. 12, driver unit 50 and microcomputer 52, which constitute a control unit, are connected to actuator 20. Microcomputer 52 is connected via interface 62 to PWM driver 54 and deviation counter 60, which is further connected via D/C converter 58 to PMW driver 54. This PWM driver 54 is connected to motor 32 of above actuator 20, and AC power 68 is connected via transformer 64 and AC/DC converter 66 to PWM driver 54. Thus, driving power is supplied to motor 32 from AC power source 68 via PWM driver 54. In addition, DC power is used in the space instead of AC power source 68. In this case, the DC power source is directly connected to the PWM driver 54.

Rotary encoder 34, connected to the axis of motor 32, is connected to encoder interface 56, which is connected to F/V converter 57, deviation counter 60, and microcomputer 52. F/V converter 57 is further connected to PWM driver 54.

According to this control unit, a rotation speed signal and positional signal are output from microcomputer 52. The rotation speed signal is supplied to PWM driver 54, which rotates motor 32. Consequently, a rotation pulse signal is output from encoder 34 connected to the rotational axis of motor 32, and is supplied to encoder interface 56. This rotation pulse signal is converted into voltage by F/V converter 57, and this voltage is fed back to PWM driver 54. Thus, motor 32 can be rotated at a predetermined speed.

The positional signal output from microcomputer 52 is D/A converted via deviation counter 60 and D/A converter 58, and is supplied to PWM driver 54. Driver 54 controls motor 32 in accordance with this positional signal. The rotation pulse signal output from encoder 34 is fed back to deviation counter 60 via encoder interface 56. Deviation counter 60 subtracts the rotation pulse signal from the positional signal. When the subtracted value become zero, PWM driver 54 stops motor 32. At the same time, a monitor pulse is output to the microcomputer from the encoder interface, and the procedure of positioning can be monitored thereby.

In the truss structure having the above structure, one first truss element 10, eight second truss elements 11, and sixteen third truss elements 12 are assembled so that each truss element obtains a statically determinate structure. In the truss structure according to the present invention, assuming that a total number of nodes of the truss structure is J and the total number of beam members 13, foldable diagonal beam members 16, and telescopic diagonal beam members 17 is M, $M = 3J - 6$ is satisfied. In this embodiment, since the numbers of nodes, beam members, and foldable diagonal beam members are 72, 156, and 18, respectively, the number of telescopic diagonal beam members 17 is 36.

Figure 7A:
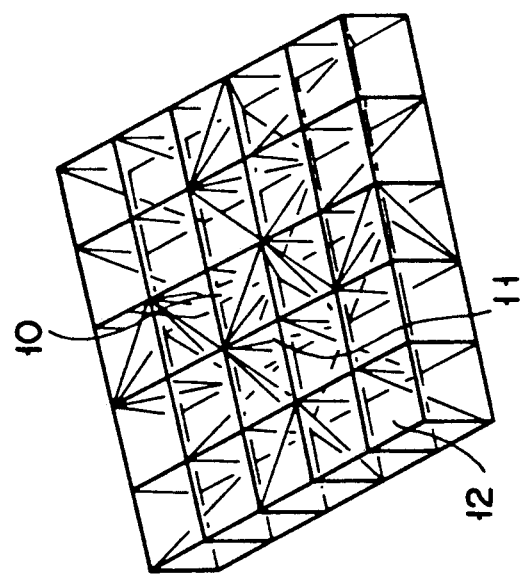
FIGS. 7A, 7B, and 7C are schematic perspective views showing a folding or deploying process of the truss according to the present invention.
Figure 7B:
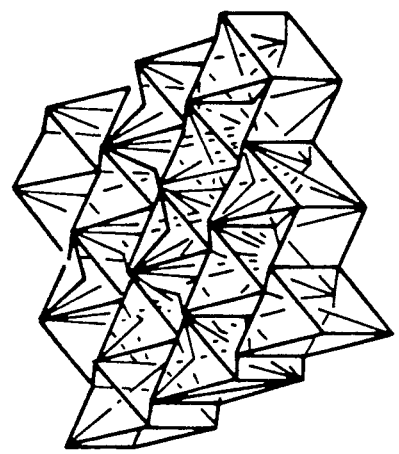
Figure 7C:
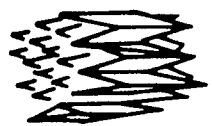

The operation and function of the truss structure according to the present invention will be described below. As shown in FIGS. 7A to 7C, in first, second, and third truss elements 10, 11, and 12, the length of each telescopic diagonal beam member 17 is adjusted by driving actuator 20. Therefore, each truss element can be freely deformed from an deployed state to a folded state or vice versa. When the truss structure shown in FIG. 7A is deformed by external heat or the like, the truss structure can be easily corrected to be an original shape by readjusting the lengths of telescopic diagonal beam members 17.

When a vibrator (not shown) is mounted on the truss structure according to the present invention, vibration of the entire truss structure can be suppressed by extending/contracting telescopic diagonal beam members 17 in correspondence with a vibration of the vibrator. That is, telescopic diagonal beam members 17 can be used as the damping material. In addition, when a vibration property of the entire truss structure is to be adjusted in order to prevent the truss structure from resonating with the vibration of the vibrator, telescopic diagonal beam members 17 may be extended/contracted. That is, by extending/contracting telescopic diagonal beam members 17, a dynamic property of the entire truss structure can be changed, thereby adjusting the vibration property (resonance frequency) of the structure.

In the truss structure according to the present invention, first, second, and third truss elements 10, 11, and 12 are assembled so that the total number M of beam members 13, foldable diagonal beam members 16, and telescopic diagonal beam members 17 and total number J of the nodes of the structure satisfy the relation of $M = 3J - 6$. For this reason, the number of members used in the truss structure of the present invention can be reduced to about 80% that of a similar structure formed by conventional foldable trusses. Therefore, the truss structure of the present invention can be made light in weight. In addition, if the truss structure according to the present invention is deformed, deformation of the shape can be easily corrected by adjusting the lengths of telescopic diagonal beam members 17. Therefore, since a special mechanism for correcting deformation as used in a conventional truss structure need not be added, the structure can be simplified and made light in weight.

Figure 9:
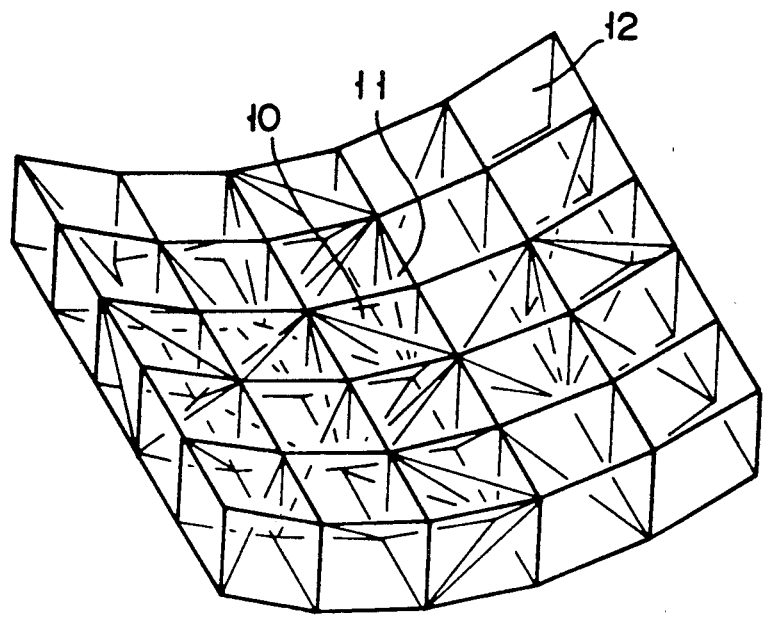
FIGS. 9 and 10 are schematic perspective views in which the truss structure according to the present invention is deformed into other shapes.
Figure 10:
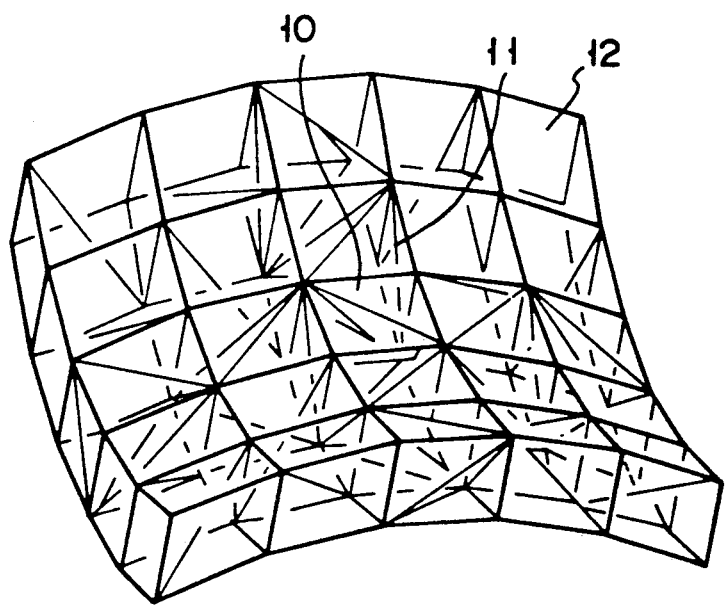

In the above embodiment of the present invention, the truss structure is deployed into a flat shape. However, the shape of the truss structure is not limited to the above geometric one. For example, the truss structure of the present invention can be formed into a shape used as a support structure for parabolic antenna 21, i.e., a shape of a paraboloid of revolution, as shown, in FIG. 8. Alternatively, as shown in FIGS. 9 and 10, a parabolic cylinder and a hyperbolic paraboloid can be formed.

In the truss structure according to the above embodiment, one first truss element 10, eight second truss elements 11, and sixteen truss elements 12 are assembled. However, when first, second, and third truss elements 10, 11, and 12 are arbitrarily assembled so that total number J of the nodes of the truss structure and total number M of the members thereof satisfy the relation of $M = 3J - 6$ and a statically determinate structure is obtained, truss structures having various shapes and sizes can be formed.

The present invention can be applied not only to a support structure constructed in the space but also to a deployable roof of a roofed baseball stadium constructed on the ground.

The present invention is not limited to the above embodiment but various changes and modifications may be made without departing from the spirit and scope of the invention.

What is claimed is:

1. A truss structure having a plurality of truss elements, said truss structure comprising:
   a foldable first truss element having:
   (i) a frame obtained by assembling a plurality of beam members into a cube, both ends of each of said beam members being pivotally hinged to a plurality of node portions of said cube;
   (ii) foldable diagonal beam members located on diagonals of two opposing planes of said frame, respectively, both ends of each of said foldable diagonal beam members being pivotally hinged to said node portions; and
   (iii) telescopic diagonal beam members located on diagonals of four planes other than said two planes of said frame, respectively, both ends of each of said telescopic diagonal beam members being pivotally hinged to said node portions;
   (b) a foldable second truss element having:
   (i) a frame obtained by assembling a plurality of beam members into a cube, both ends of each of said beam members being pivotally hinged to a plurality of node portions of said cube;
   (ii) foldable diagonal beam members located on diagonals of two opposing planes of said frame, respectively, both ends of each of said foldable diagonal beam members being pivotally hinged to said node portions; and
   (iii) telescopic diagonal beam members located on diagonals of three planes other than said two planes of said frame, respectively, both ends of each of said telescopic diagonal beam members being pivotally hinged to said node portions;
   (c) a foldable third truss element having:
   (i) a frame obtained by assembling a plurality of beam members into a cube, both ends of each of said beam members being pivotally hinged to a plurality of node portions of said cube, and
   (ii) a telescopic diagonal beam member located on the diagonal connecting farthest node portions of said frame, both ends of said telescopic diagonal beam member being pivotally hinged to said node portions; and
   (d) adjusting for adjusting the length of each telescopic diagonal beam member mounted in said first, second, and third truss elements.

2. A structure according to claim 1, wherein, assuming that a total number of said nodes of said truss structure is J and a total number of said beam members, said foldable diagonal beam members, and said telescopic diagonal beam members of said truss structure is M, said first, second, and third truss elements are assembled to satisfy a relation of $M = 3J - 6$.

3. A structure according to claim 1, wherein said first, second, and third truss elements are arranged so that each truss element obtains a statically determinate structure.

4. A structure according to claim 1, wherein said first truss element is located at the center of said truss structure, said second truss element is hinged to each of four side planes of said first truss element, another second truss element is hinged to an outer side plane of each of said second truss elements, and said third truss elements are located at both sides of each of said second truss elements, thereby forming a rectangle each side of which consists of five truss elements.

5. A structure according to claim 1, wherein said length adjusting means includes a motor and a ball screw mounted on said telescopic diagonal beam member.

* * * * *